No. 665,530. Patented Jan. 8, 1901.
W. G. JOHNSON.
HORSE BOOT.
(Application filed Jan. 22, 1900.)
(No Model.) 2 Sheets—Sheet 1.
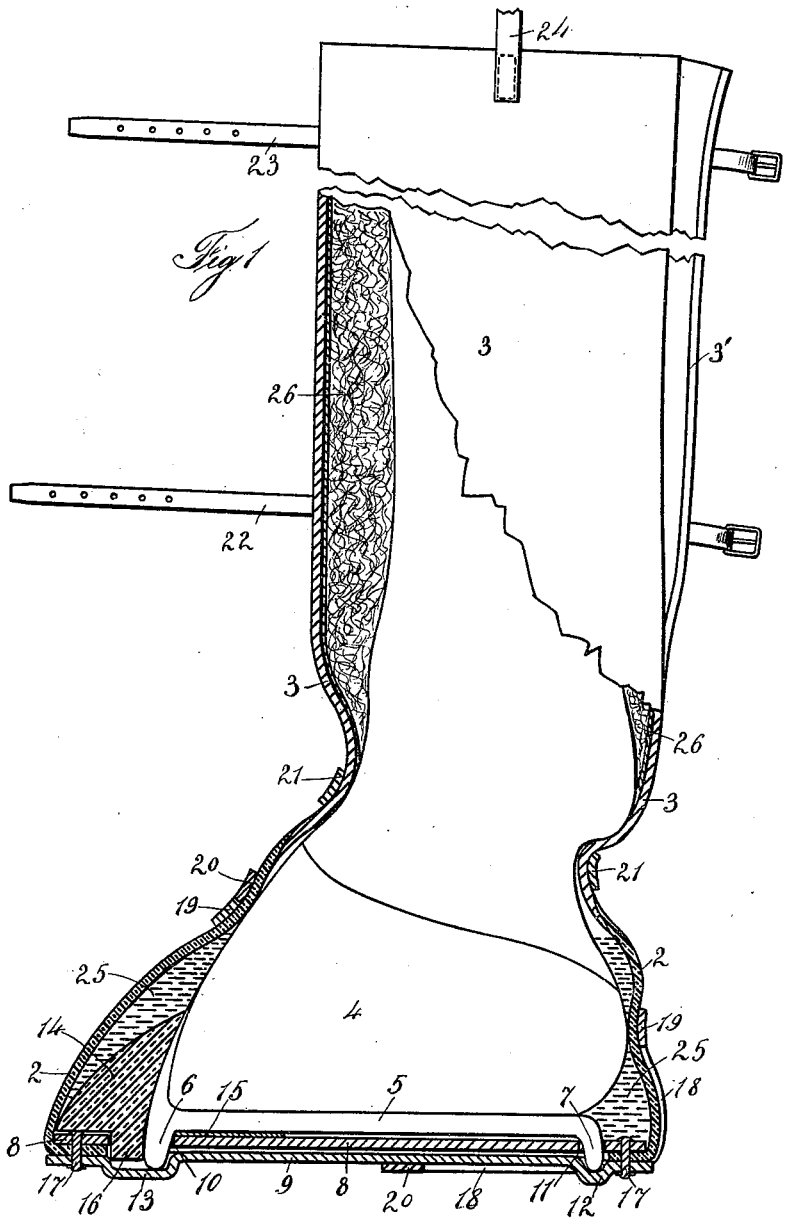
WITNESSES: INVENTOR.
C. F. Patterson William G. Johnson
M. A. Dodsworth PER
Geo. W. Ives.
ATTORNEY.

No. 665,530. Patented Jan. 8, 1901.
W. G. JOHNSON.
HORSE BOOT.
(Application filed Jan. 22, 1900.)
(No Model.) 2 Sheets—Sheet 2.
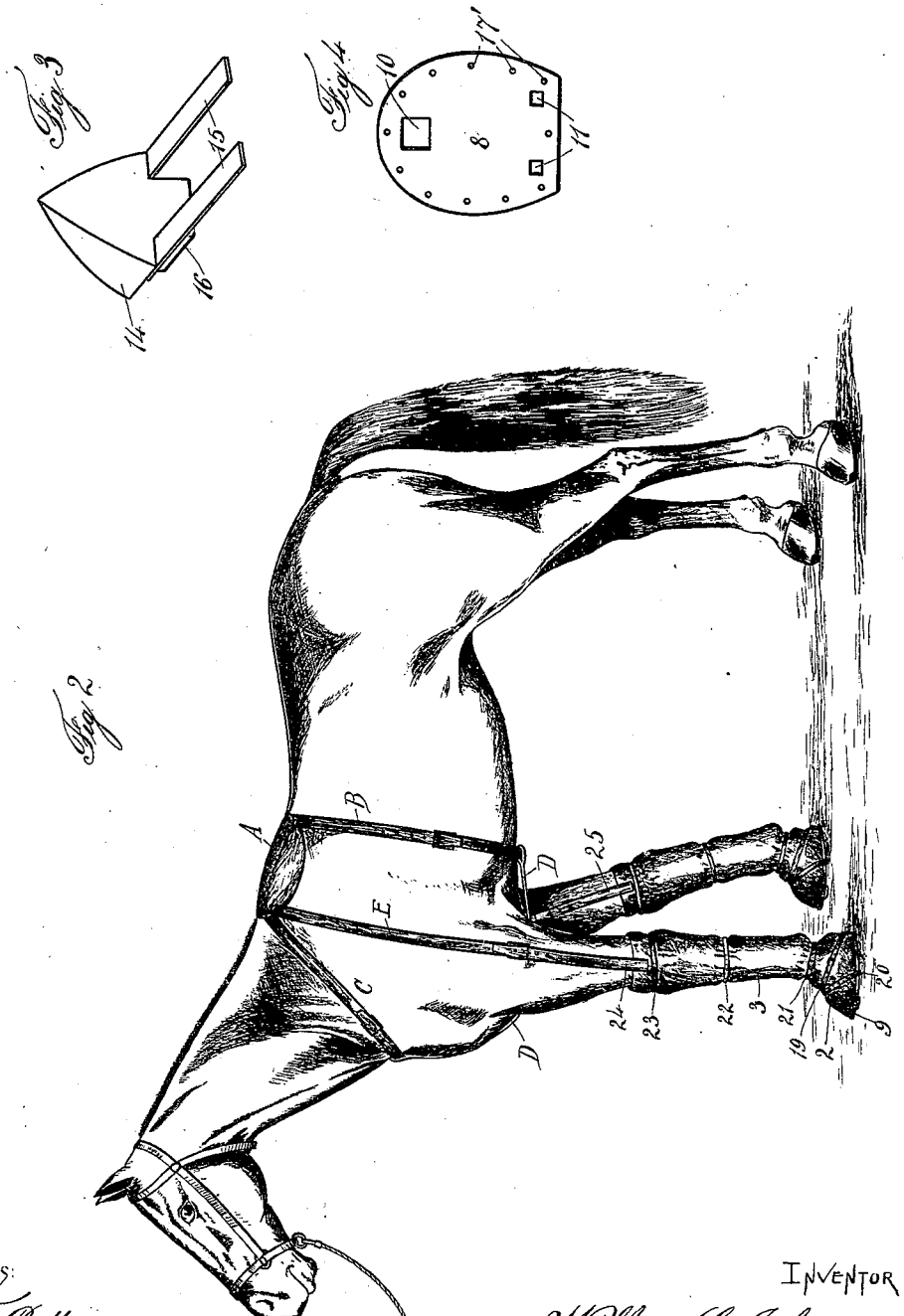
WITNESSES:
C. F. Patterson
M. A. Dodsworth
INVENTOR
William G. Johnson
PER Geo. W. Rees
ATTORNEY

UNITED STATES PATENT OFFICE.

WILLIAM GRIEST JOHNSON, OF OMAHA, NEBRASKA.

HORSE-BOOT.

SPECIFICATION forming part of Letters Patent No. 665,530, dated January 8, 1901.

Application filed January 22, 1900. Serial No. 2,276. (No model.)

*To all whom it may concern:*

Be it known that I, WILLIAM GRIEST JOHNSON, residing at Omaha, in the county of Douglas and State of Nebraska, have invented certain new and useful Improvements in Horse-Boots; and I do hereby declare that the following is a full, clear, and exact description of the invention, such as will enable others skilled in the art to which it appertains to make and use the same, reference being had to the accompanying drawings, which form a part of this specification.

This invention relates to a novel horse-boot.

The object of my invention is to provide a horse-boot that shall be liquid-tight below and practically air-tight above, so that the upper portion of the boot may be used to provide a jacket or covering adapted to produce a sweat; and my improved horse-boot is further adjustable to various-sized hoofs, and when secured forms a neat appliance which may be readily attached or disconnected.

In the accompanying drawings I have shown in Figure 1 a sectional view of a horse-boot embodying my invention with portions cut away. Fig. 2 shows my boots as attached to the fore feet of a horse. Fig. 3 shows the filler adapted to be put in the shoe, while Fig. 4 shows a top view of one of the plates.

My invention embodies, essentially, a horse-boot comprising the approximately oval-shaped lower boot-section 2, preferably made of rubber or other water-tight material, and which lower boot-section is held between an upper and lower sole, as it were, (marked 8 and 9, respectively.) The edge of this lower boot-section 2 is securely fastened between these two plates by means of suitable bolts or rivets 17. The lower shield 9 is provided with three indentations, (marked 12 12 and 13,) which form three projections extending beyond the face of this lower plate 9, and these three projections carry the weight of the boot and animal within the same. The upper plate 8 is provided with three openings, (marked 10 and 11 11,) and these openings, as is shown in Fig. 4, come immediately above the indentations 12 and 13, as will be understood in referring to Fig. 1.

As far as described, it will be noticed that I have shown a horse-boot provided with two metallic soles, between which is held the liquid-tight lower boot-section 2, preferably of rubber or like material. This lower boot-section is as large at the upper end as at the lower, so that the animal's hoof may be readily inserted into the boot, and to this lower boot-section 2 is secured an upper boot-section 3, which upper boot-section 3 is preferably of leather, rubber, or the like, so as to make the same practically air-tight, and is slit, as is shown at 3' in Fig. 1, so that the upper boot-section may be overlapped and made to snugly fit the animal's leg. At suitable points this upper boot-section 3 is provided with a cushion 26, as is shown in Fig. 1. This upper boot-section is further provided at suitable points with the straps 22 and 23, so that the boot may be readily and properly secured to the animal's leg, the upper strap 23 coming above the knee of the animal, as is shown in Fig. 2.

In order that the lower boot-section 2 may be securely held to the animal's hoof, I provide the strap 20, which passes below the plates 8 and 9, and the additional strap 19, which passes from in front to the rear of the hoof, as clearly shown in Fig. 2, while the strap 21 further secures the boot to the animal's ankle, so as to provide a neat fit. By this means the fluid, semifluid, or medicinal compound placed within the lower part of the boot cannot splash out. In order to provide a boot adapted to fit different-sized hoofs, I make the slot 10 and indentation 13 of a suitable length so that a filler 14, of rubber or other suitable material, which is adapted to fit in front of the toe of the animal, may work into the lower-plate indentation 13, while the arms 15 15 project from below the filler 14, and upon these arms 15 15 the hoof of the animal is adapted to rest, and so keep this filler in place. These fillers or plugs are of suitable sizes and aid in insuring a snug tight fit of the boot to the horse's hoof.

The forward indentation or seating 13 is adapted to receive the forward toe-calk 6 of the horse's shoe, while the rear indentation 12 is adapted to receive the rear calk 7 of the horse's shoe, as is shown in Fig. 1.

The hoof is held within the boot in a neat compact way, and the animal cannot dislodge the same in stamping or kicking.

The upper material being practically airtight, the limb of the animal may be brought into a sweat, which is highly desirable at certain times and in certain cases.

In order to further secure the boot to the horse's leg, I provide a saddle A, from which extend the belly-band B and neck-band C. The belly-band and neck-band are united by the strap D, which below is adapted to receive the strap 25, as shown in Fig. 2, while the shoulder-strap E depends from the saddle A upon two sides, provided with a buckle adapted to adjustably receive the boot-strap 24, so that the boots are nicely secured to the animal.

Having thus described my said invention, what I claim as new, and desire to secure by United States Letters Patent, is—

1. In a horse-boot of the character described, a lower shield or plate provided with heel and toe indentations, an upper plate provided with three openings registering with said indentations, and a boot proper made of water-tight material and held between said upper and lower shields or plates.

2. In a horse-boot of the character described, a lower shield or plate provided with heel and toe indentations, an upper plate provided with three openings registering with said indentations, a boot proper made of water-tight material and held between said upper and lower shields or plates, a cushion within the upper portion of said boot, and straps to secure said boot to the horse's foot.

3. The combination with a lower plate provided with indentations serving as seatings for calks, of an upper plate having openings registering with said seatings, a lower boot-section secured between said two plates to form a liquid-tight receptacle, a plug adapted to work into said toe-calk seating and provided with a stem upon which the hoof of the animal is adapted to rest, an upper boot-section, and straps secured to said boot-sections, as and for the purpose set forth.

WILLIAM GRIEST JOHNSON.

In presence of—
GEORGE W. SUES,
MABEL A. DODSWORTH.